Feb. 20, 1940.    P. OTTO    2,190,801
APPARATUS FOR MOLDING BRICK STEPS
Filed Feb. 27, 1939    2 Sheets-Sheet 1
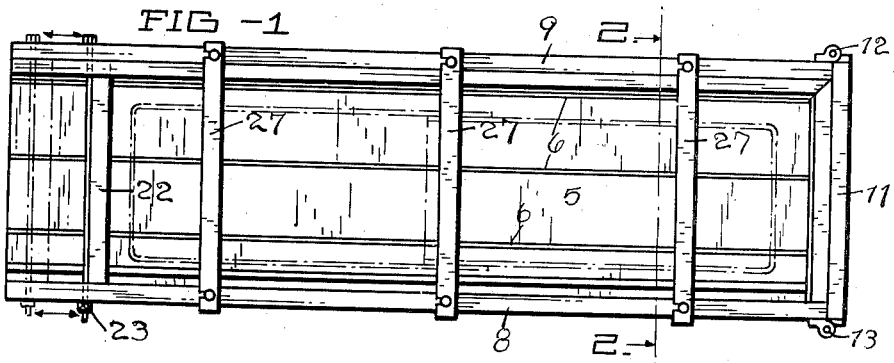
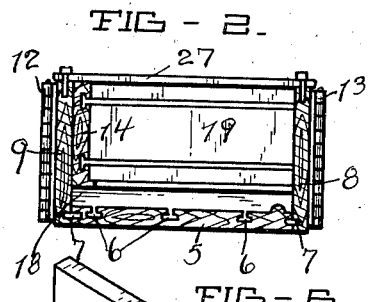
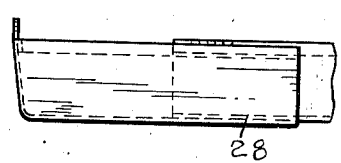
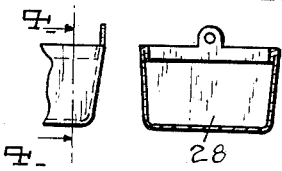
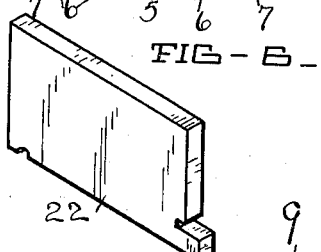
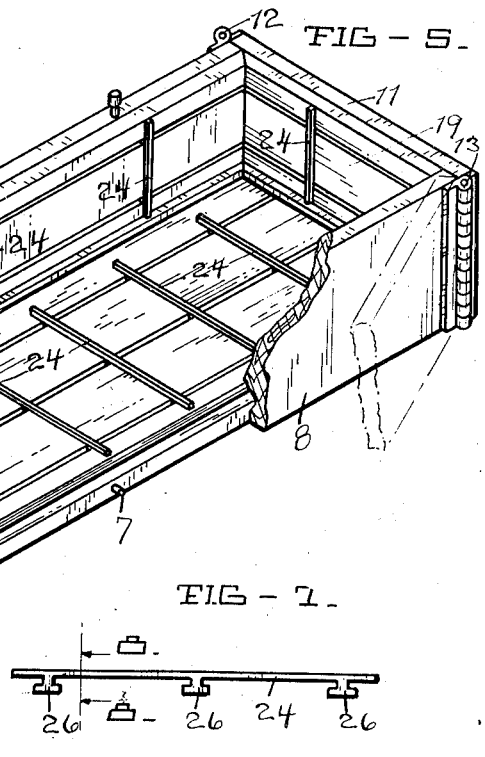
INVENTOR
PAUL OTTO
BY
C. L. Drew
ATTORNEY Feb. 20, 1940.    P. OTTO    2,190,801
APPARATUS FOR MOLDING BRICK STEPS
Filed Feb. 27, 1939    2 Sheets-Sheet 2
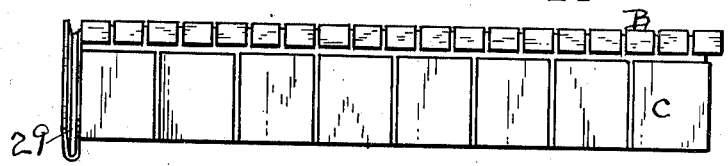
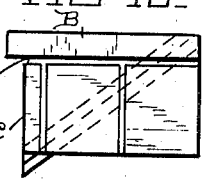
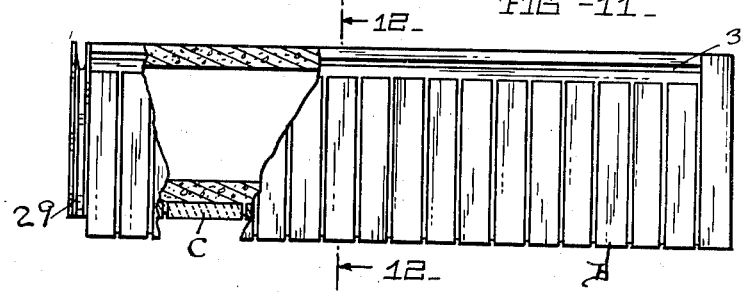
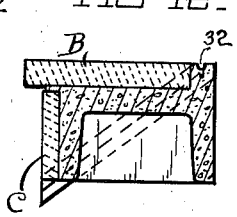
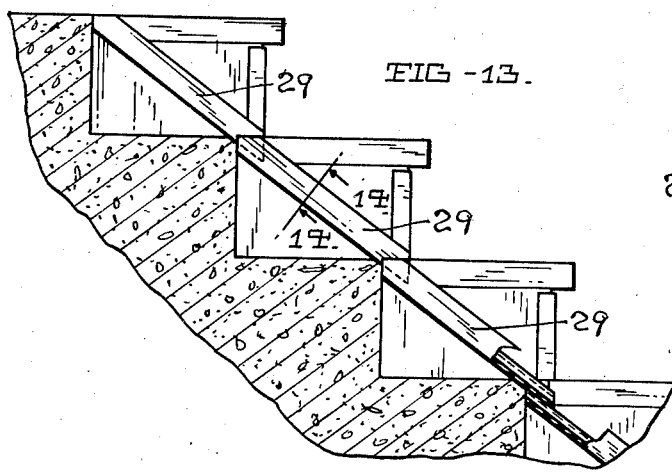
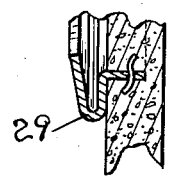
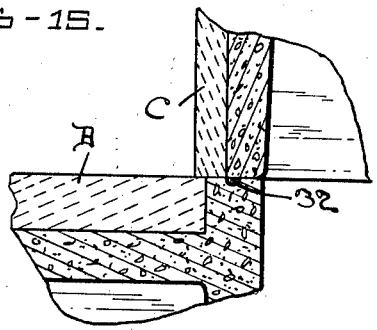
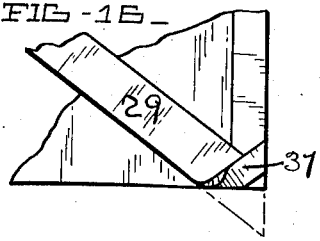
INVENTOR.
PAUL OTTO
BY
ATTORNEY.

Patented Feb. 20, 1940

2,190,801

UNITED STATES PATENT OFFICE 2,190,801

APPARATUS FOR MOLDING BRICK STEPS

Paul Otto, San Francisco, Calif.

Application February 27, 1939, Serial No. 258,714

2 Claims. (Cl. 25—118)

This invention relates to improvements in forms for making monolithic brick steps.

The principal object of this invention is to produce a form in which bricks or tiles may be set and spaced in any desired arrangement so that a plastic material, such as concrete, may be poured upon the bricks to unite them into a step structure.

A further object of the invention is to provide means for spacing the tread bricks as well as the riser bricks uniformly, whereby the spacing arrangement forms the tooling between the bricks.

A further object is to produce a device of this character which is economical to manufacture, readily transportable, and a device which may be varied in size to accommodate steps of various widths, lengths, and heights.

Other objects and advantages will be apparent during the course of the following description.

In the accompanying drawings forming a part of this specification and in which like numerals are employed to designate like parts throughout the same, Fig. 1 is a top plan view of my form;

Fig. 2 is a cross sectional view taken on the line 2—2 of Fig. 1;

Fig. 3 is a side elevation of one of the core pans;

Fig. 4 is a cross sectional view taken on the line 4—4 of Fig. 3;

Fig. 5 is a perspective view of my form, showing one side thereof broken away;

Fig. 6 is a perspective view of the adjustable end block;

Fig. 7 is a side elevation of one of the spacers;

Fig. 8 is a cross sectional view taken on the line 8—8 of Fig. 7 and slightly enlarged;

Fig. 9 is a front elevation of a completed step;

Fig. 10 is an end elevation, looking from the right of Fig. 9;

Fig. 11 is a top plan view of Fig. 9, showing a portion thereof broken away;

Fig. 12 is a cross sectional view taken on the line 12—12 of Fig. 11;

Fig. 13 is a side elevation of a series of steps constructed in accordance with my invention and showing a flashing strip formed integral therewith;

Fig. 14 is a cross sectional view taken on the line 14—14 of Fig. 13 and enlarged;

Fig. 15 is a fragmentary cross sectional view, showing the seal between adjacent steps; and Fig. 16 is a fragmentary detailed view, showing the manner in which the flashing may be bent when placed in the mold.

In the forming of brick steps it has been customary to build up a wooden form, upon which the concrete or grout is placed and the bricks embedded therein. This arrangement is unsatisfactory for the reason that the wooden forms rot away; and unless a very heavy layer of concrete is used, the steps may break under a load and cause serious injury to persons using the same. Also, it is difficult for a bricklayer to accurately space the bricks.

With my arrangement it is possible to form the steps at a central plant and to transport them to the job ready to be placed. This makes for an economical installation as well as saving time at the job, and the stairs may be used as soon as the steps are installed.

In the accompanying drawings wherein for the purpose of illustration is shown a preferred embodiment of my invention, the numeral 5 designates a base which comprises an elongated member having key slots 6 formed therein. Pins 7 project from the side edges of the base and are adapted to enter holes in the side boards 8 and 9, which are hinged to an end board 11, the hinges being shown at 12 and 13.

The side board 9 carries a face board 14 which has key slots 16 and 17. This face board has its lower margin spaced above the base board 5 so as to form a nosing space 18. A similar face board is secured to the end board 11 and is designated by the numeral 19. The face boards 14 and 19 are provided with a ledge 21, the purpose of which will be later seen.

A movable end board is shown at 22, and this end board may be adjustably slid along the base 5 and between the side boards 8 and 9 and held in adjusted position by cross bolts 23 (see Fig. 1).

Referring now to Fig. 7, it will be noted that I have shown one of the spacers 24 having keys 26, which keys are slidable in the key slots 6 or in the key slots 16 and 17, as the case may be.

Extending across the form are crosspieces 27 of any desired number, which crosspieces serve to position and maintain the core pan in proper position in the form and to prevent the same from floating out when the form is filled with concrete. This core pan is extensible, as shown in Fig. 3, and bears the numeral 28.

In use the form is set up, as illustrated in Fig. 5, and tread bricks are then placed upon the base 5 and between the spacers 24. Also, the riser bricks are placed upon the ledge 21 of the face boards 14 and 19 with a spacer between each riser brick.

It will be here noted that the tread bricks are laid upon the base in such a way that one end of the brick will lie within the nose opening 18 and that the ledge 21 will support the riser bricks from the tread bricks the proper distance to give the effect shown at A (see Fig. 10).

After the bricks have all been placed in the form, the end board 22 is moved to its proper position, and the cross bolts 23 are tightened in their adjusted position. Any desired form of grout may now be placed in the mold so that it will flow between the bricks and come to rest against the spacers 24. This will result in the grout being recessed between the bricks, thus producing a pleasing effect. The mold is now filled with concrete, and reinforcing bars may be included, if desired. At the same time, the core pan is positioned within the form so that the concrete will have a uniform thickness at the front, back, ends, and beneath the tread, which, of course, will make a much stronger and lighter step than if the form were filled with concrete.

Referring now to Fig. 13, it will be noted that I have provided means for including a flashing in the step construction, which flashing consists of a copper piece 29 partly embedded in the concrete and having a valley which will catch any moisture and conduct the same to the flashing below, as illustrated in Fig. 13. When the flashings are placed in the form, one end of the flashing may be turned up, as shown at 31, during the forming of the step and later turned down into position, as shown in dotted lines in this figure.

In order to seal the adjacent steps, I may cast a groove 32, in which a sealing compound may be placed. This groove is formed by the bead 33 shown in Fig. 5.

The tread bricks above referred to are designated by the letter B, and the riser bricks are designated by the letter C.

It will thus be seen that I have produced a monolithic step which will be pleasing in appearace, strong, easy to handle, and a step which eliminates the rotting away of the usual forms commonly employed in the making of brick steps.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A brick step forming device comprising a mold having a base member, an end member secured thereto, side members hinged to said end member and removably attached to said base member, said base member and one of said side members having key slots formed therein, key spacers slidable in said slots, whereby bricks supported on said slotted members will be held in spaced relation, and a sliding end piece adjustably held between said side members and spaced from said hinged end member.

2. A brick step forming device comprising a mold having a base member, an end member secured thereto, side members hinged to said end member and removably attached to said base member, said base member and one of said side members having key slots formed therein, key spacers slidable in said slots, whereby bricks supported on said slotted members will be held in spaced relation, a sliding end piece adjustably held between said side members and spaced from said hinged end member, and a core pan supported by said sides and in spaced relation with respect to said bricks.

PAUL OTTO.